W. C. LE PETRIE.
CHOCOLATE BEATER.
APPLICATION FILED DEC. 23, 1921.

1,433,959.

Patented Oct. 31, 1922.
4 SHEETS—SHEET 4.

Inventor
William C. LePetrie

Patented Oct. 31, 1922.

1,433,959

UNITED STATES PATENT OFFICE.

WILLIAM C. LE PETRIE, OF MONTREAL, QUEBEC, CANADA.

CHOCOLATE BEATER.

Application filed December 23, 1921. Serial No. 524,463.

*To all whom it may concern:*

Be it known that I, WILLIAM C. LE PETRIE, a citizen of the United States, and resident of the city of Montreal, in the Province of Quebec and Dominion of Canada, have invented certain new and useful Improvements in Chocolate Beaters, of which the following is a full, clear, and exact description.
This invention relates to improvements in chocolate beating machines or blending machines, and the object of the invention is to provide a machine which will quickly and thoroughly beat or mix together the cocoa and other ingredients and develop a perfectly smooth uniform mixture.

A further object is to provide a machine which will thoroughly work the whole mass of material.
A still further object is to provide a machine which may be easily and quickly emptied.

Another object is to provide means for substantially inverting the vessel to quickly and easily dump the contents.

Various other objects and advantages will be apparent from the following general and detailed descriptions.

The invention consists essentially in providing a substantially cylindrical vessel disposed axially horizontally, and containing a revoluble beating and grinding or crushing element disposed axially coincident with the vessel. The vessel is provided at the top with a large opening for convenience in filling, cleaning and inspection of the product and at the bottom with a large gated outlet. The lower part at least of the vessel is provided with a jacket for the circulation of a heating and tempering agent. Means are provided to rotate the vessel around its axis so as to easily dump the contents.

In the drawings which illustrate one embodiment of the invention;—

Figure 1:
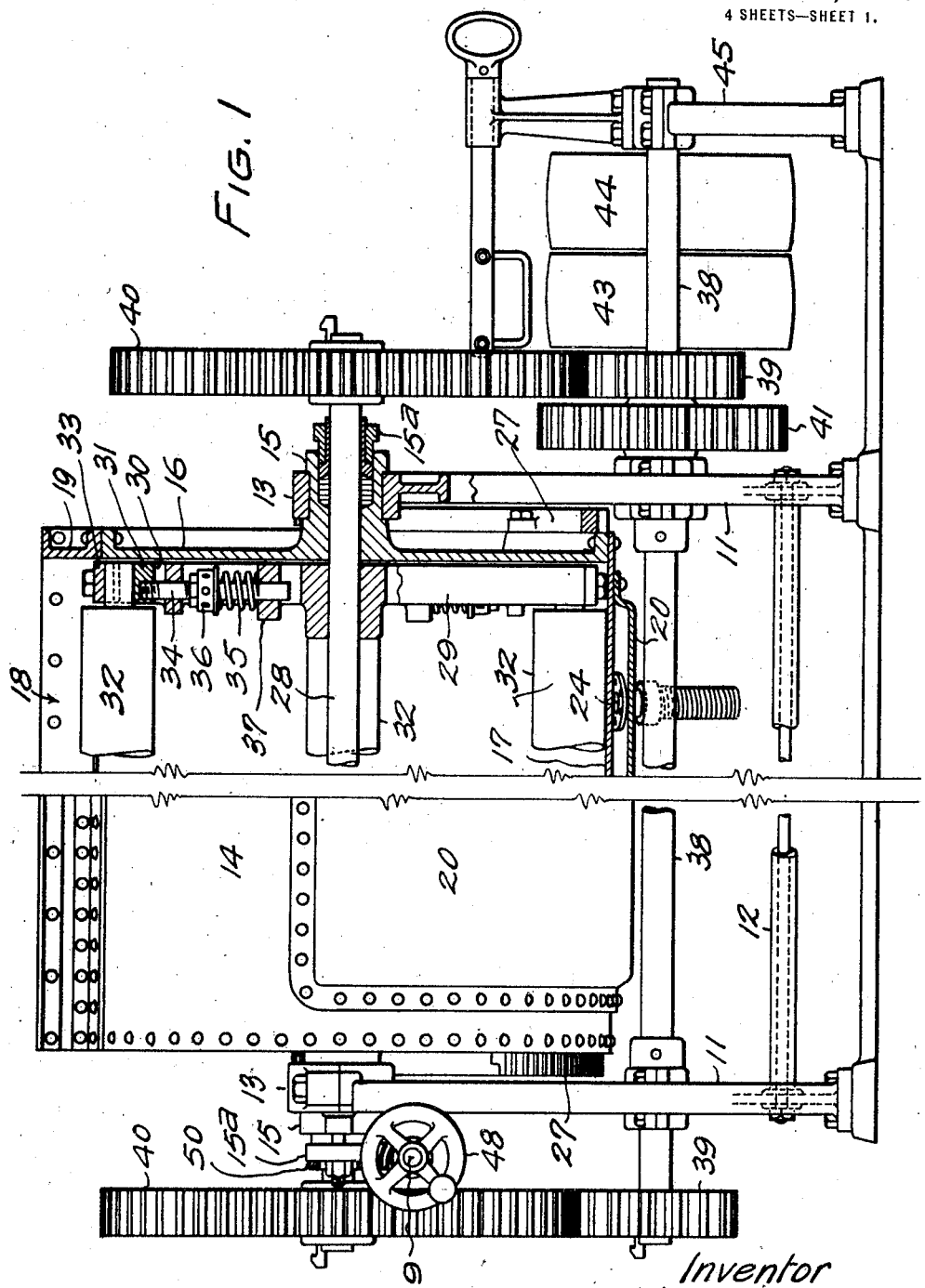
Fig. 1 is a side elevation of the device partly in section.
Figure 2:
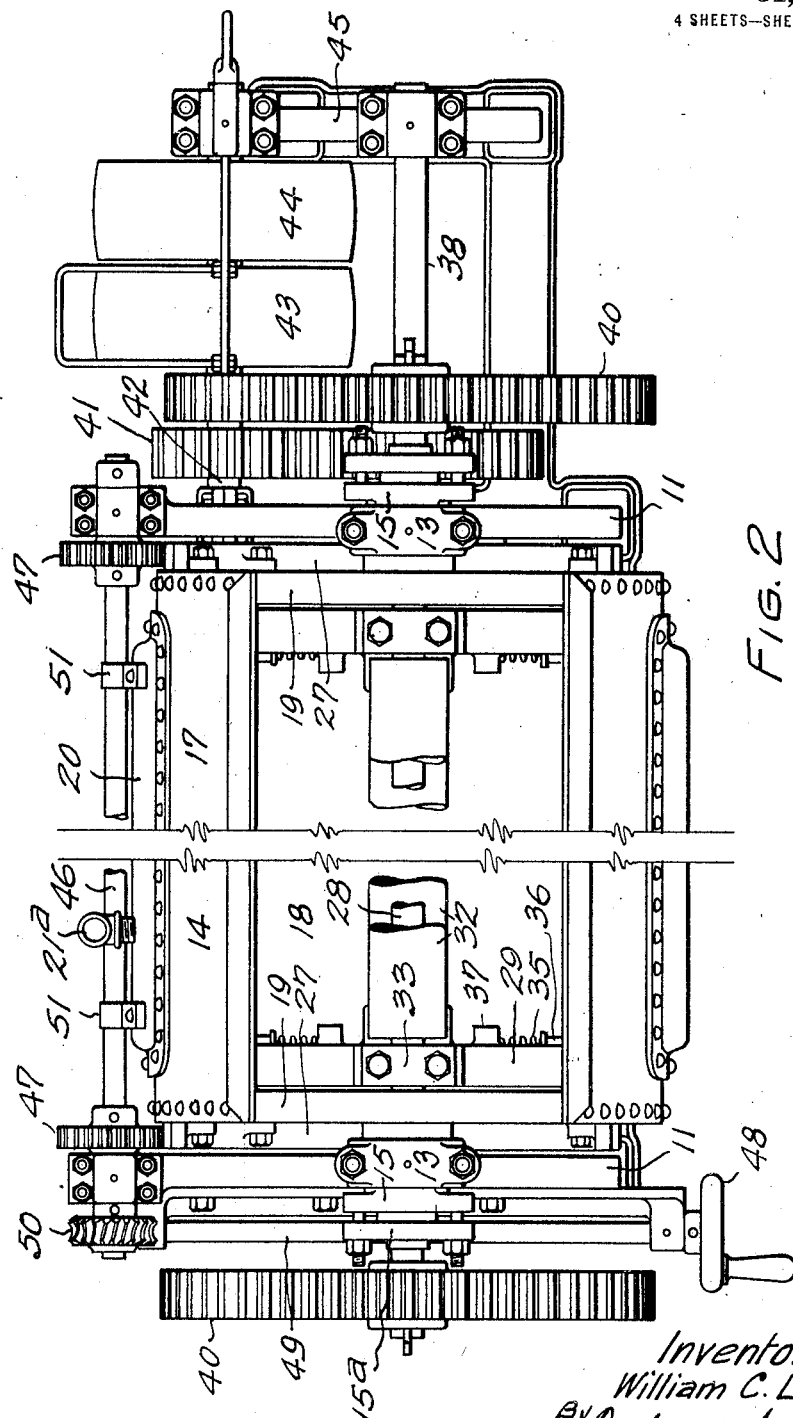
Fig. 2 is a plan view.
Figure 3:
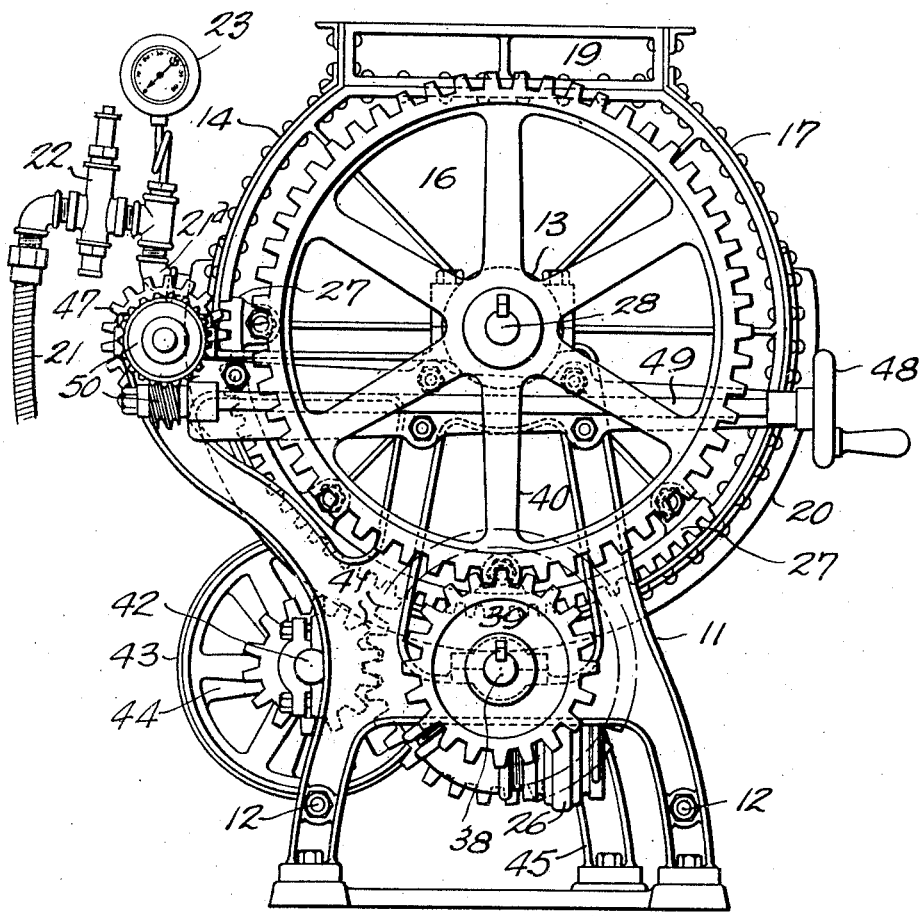
Fig. 3 is an end elevation.

Referring more particularly to the drawings, 11 designates a pair of end frames rigidly supported by stays 12 of any suitable form extending between them. The upper parts of the frames are provided with bearings 13 in which a subtsantially cylindrical vessel 14 is journalled by means of hollow trunnions 15. The vessel comprises preferably a pair of substantially flat and substantially circular end plates 16 outwardly flanged at their peripheries for the attachment of a cylindrically curved shell 17. This shell does not extend entirely around the end plates but leaves an opening 18 of appreciable width extending between the end plates. The end plates may be provided with short radially projecting extensions 19 on which the shell 17 is continued so as to form a mouth ring projecting beyond the surface of the shell 17. If desired, however, this mouth ring may be formed of separate members attached to the shell and end plates. A plate 20 is attached at its edges to the shell and extends from end to end thereof and preferably at least half way around the circumference in spaced relation to the shell, so as to provide a jacket space for the circulation of a heating agent. This heating agent is conducted to the device through a flexible pipe 21 and admitted through a connection 21ª, a regulating valve 22 and pressure gauge or thermometer 23 being provided. The spent heating agent is withdrawn at the point 24, which is preferably located at what is normally the lowest point of the jacket. The reason for this is that the heating agent preferably used is steam, so that the location of the outlet provides for the elimination of condensate. At any suitable point, preferably that which is normally the bottom of the vessel, a large outlet 25 is provided having a controlling valve or gate 26 of a type capable of dealing with very heavy liquids. The end plates of the vessel are each provided with an arcuate rack 27.

Figure 4:
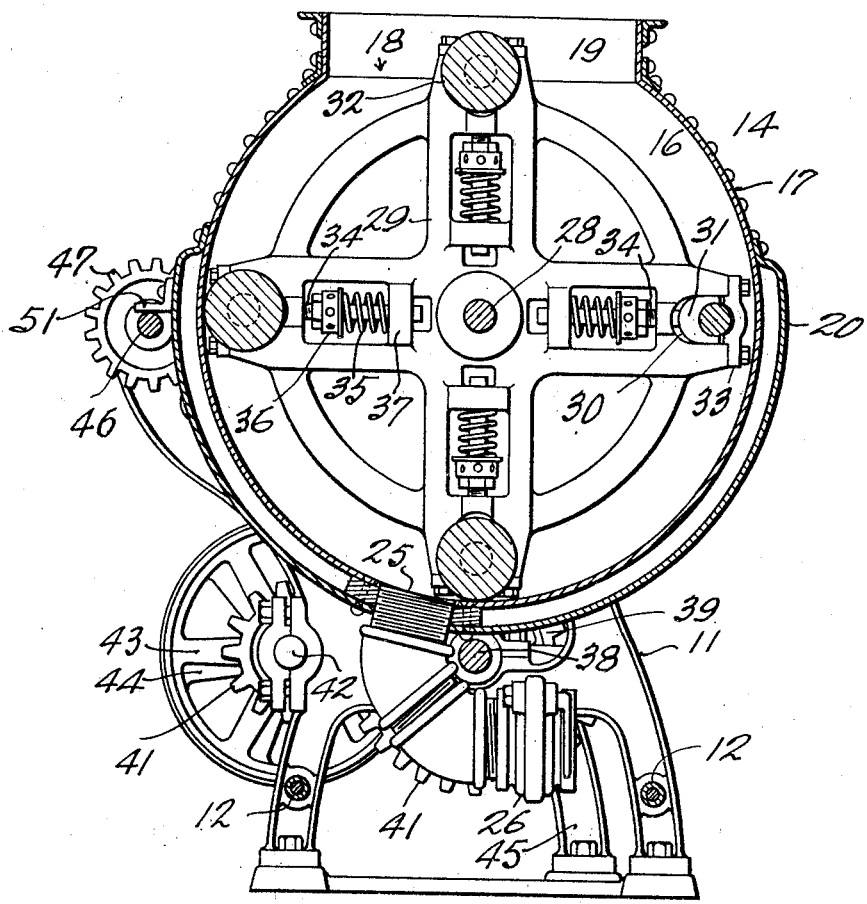
Fig. 4 is a cross section.

A beater is located within the vessel and disposed axially coincident therewith. This beater comprises a shaft 28 journalled in and passing through the hollow trunnions 15. any suitable form of packing designated 15ª being provided to make liquid tight joints. A pair of end members 29 are rigidly mounted on the shaft 28 close against the end plates 16. These end members are preferably in the form of star wheels, as shown in Figure 4, but may be of any other suitable construction. Each member 29 is provided at a plurality of points in its circumference with notches 30 to receive sliding journal boxes 31 in which are journalled heavy rollers 32 extending between the two end members 29 and adapted to bear outwardly and against the inner surface of the cylindrical vessel shell. Caps 33 are provided to hold the rollers and their journal boxes against escape by centrifugal action as they pass the opening 18. Each journal box is provided with a stem 34 rigidly connected thereto and slidably mounted in radial arrangement in a member 29. Springs 35 are mounted in compression between adjustable collars 36 on the stems and any suitable abutments 37 on the members 29. Conveniently, the members may be apertured for the reception of the springs and the abutments 37 will then be the inner ends of such apertures. The springs are arranged as will be clearly seen from Figure 4 to press the rollers against the shell 17 and, by adjusting the compression of these springs by means of the collars 36, the pressure of the rolls against the shell may be regulated. Obviously, the adjustment of the caps 33 must be such as will permit engagement of the rollers and shells but should not permit any appreciable outward movement more than is necessary for this, in order to avoid outward projection of the rolls by centrifugal action and their consequent pounding on the shell at the edges of the opening 18.

A shaft 38 is journalled in the frames 11 and carries at each end a pinion 39 meshing with a large gear 40 on the beater shaft 28. The shaft 38 receives rotary motion through a gear train 41 from a counter shaft 42 carrying fixed and loose pulleys 43 and 44. This counter shaft may be mounted in any suitable manner, for example, one end may be journalled in one of the frames 11 and the opposite end in a suitable standard 45 located adjacent the frame 11.

A shaft 46 is journalled at any suitable points in the frames 11 and carries toward the ends thereof pinions 47 meshing with the racks 27 on the ends of the vessel. This shaft 46 is preferably mounted at what may be termed the back of the machine and is controlled from what may be termed the front of the machine by a hand wheel 48, mounted on a shaft 49 extending to the back of the machine and having worm gear connection 50 with the shaft 46. Stops 51 may be secured to the vessel to engage the shaft 46 and limit rotation of the vessel.

The operation of the device is as follows:—

The mixture of ingredients such as cocoa, sugar and the like taken from a so-called finishing machine, together with the necessary amount of cocoa butter or other material, is introduced through the opening 18 into the vessel 14. Steam in proper amount is admitted to the jacket and the machine started by slipping a belt from the loose to the fixed pulley. The power is delivered through the gear trains to the beater which revolves at comparatively low speed within the vessel and, by the outward pressures of the rolls due both to centrifugal and spring action, the ingredients are rolled or rubbed between the rollers 32 and the cylindrical shell of the vessel. The rolls also exert a limited churning or stirring action, so that in time every particle of the mass will have passed one or more times between the rolls and shell. The gradual warming of the material by contact with the heated portion of the shell thins the material, so that it flows more readily and has no tendency to cling in a sticky mass to the shaft 28 and allow the rolls to revolve practically in air around it. The force of gravity will of course be operative to precipitate the material to the lowest point of the vessel, so that the full length of each roll will pass through the material. As the rolls move through the mass of material which extends to the level of the shaft or slightly above, the rolls crush or squeeze the material between themselves and the shell and, after the rolls rise above the level of the material, they are of course heavily coated with it and the crushing or squeezing action continues as long as the rolls are in contact with the shell. Owing to the horizontal disposition of the drum and rolls, 100% of the engaging surfaces of the parts are active, regardless of the amount of material in the machine. The constant stirring up and rolling out or squeezing which the material receives soon results in a very perfect blending of all ingredients and the development of the desired characteristics and properties to the fullest extent. The resulting product is very smooth and creamy and without any trace of distinct particles, as these have all been rolled or crushed into such a fine state of division that they cannot be detected by the human senses. In addition, the mixing is so perfect that the consistency, texture and flavor of the product are uniform throughout. When the blending is complete, the material may be removed from the vessel either by opening the gate 26 or by substantially inverting the vessel, so that the material runs out through the top opening. This inversion is accomplished by rotating the hand wheel 48 which rotates the shaft 46 and, through the pinions 47 and rack 27, rotates the vessel on its trunnions 15. If the top opening 18 is used for emptying, it will be readily understood that the bottom gate 26 will be convenient when washing the machine. The flexible steam supply 21 permits the inverting of the vessel whenever desired.

These desired results of perfect blending are obtained according to this invention with remarkable ease and rapidity, regardless of whether the machine is operated with the full charge or only a partial charge, and this is believed to be due to the horizontal disposition of the vessel and the beating rolls, which renders the whole length of each roll and the whole interior surface of the vessel available for beating purposes, and also ensures the flow of the material into contact with the active surface of the vessel; the inactive ends being vertical and therefore unable to support any idle material.

Having thus described my invention, what I claim is:—

1. A machine of the class described, comprising a cylindrical horizontally disposed vessel and a rotatable beater therein comprising a shaft extending longitudinally of the vessel, slotted end members mounted on the shaft adjacent the vessel ends, horizontally disposed rolls radially slidable in the end member slots, springs disposed to press said rolls against the vessel wall and removable means closing the outer ends of said slots to hold the rolls against escape from the end member slots due to spring and centrifugal action.

2. An agitator for use in a machine of the class described, comprising rotatable end members, provided with opposing radial slots, rollers extending between said members, and having their ends disposed in opposing slots, a roller engaging slide movable in each slot for engaging and holding the roller toward the outer end of the slots, a stem carried by each slide, a spring encircling the stem and confined, in compression, between complementary abutments carried by the stem and end member, respectively, and a movable abutment on the stem engaging the spring and adjustable to regulate the pressure exerted by the latter.

In witness whereof, I have hereunto set my hand.

WILLIAM C. LE PETRIE.